Figure 1:
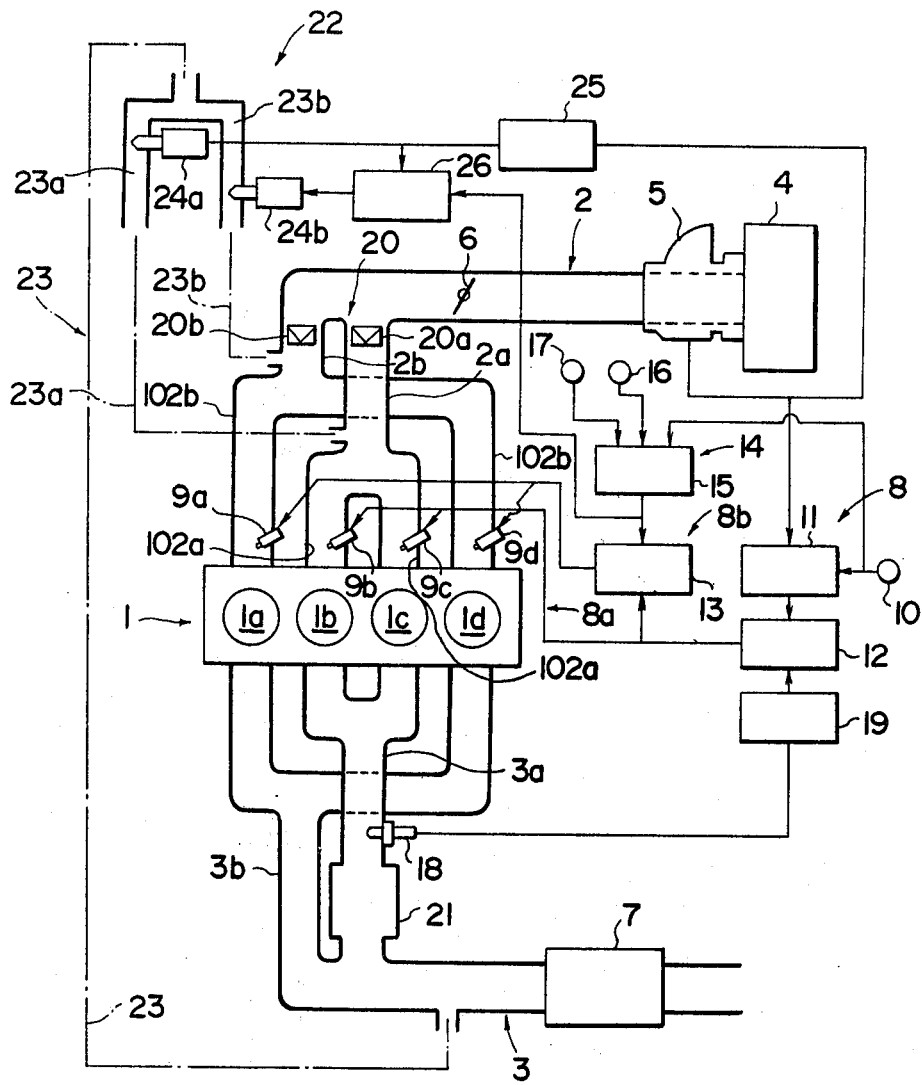

United States Patent [19]

Tanaka et al.

[11] 4,409,949
[45] Oct. 18, 1983

[54] EXHAUST GAS RECIRCULATION CONTROL MEANS FOR MULTIPLE CYLINDER ENGINE HAVING MEANS FOR CONTROLLING AIR-FUEL RATIO IN ACCORDANCE WITH A SIGNAL FROM AN EXHAUST GAS SENSOR

[75] Inventors: Hideki Tanaka; Yoshitaka Tabara; Masaaki Taniguchi, all of Hiroshima, Japan

[73] Assignee: Toyo Kogyo Co., Ltd., Hiroshima, Japan

[21] Appl. No.: 357,153

[22] Filed: Mar. 11, 1982

[30] Foreign Application Priority Data

Mar. 11, 1981 [JP] Japan .................................. 56/35635

[51] Int. Cl.³ ...................... F02M 25/06; F01N 3/15; F02B 3/00
[52] U.S. Cl. .................................... 123/571; 123/568; 123/443; 123/198 F
[58] Field of Search ............. 123/571, 568, 743, 198 F

[56] References Cited

U.S. PATENT DOCUMENTS

| 3,963,002 | 6/1976 | Sueishi et al. | 123/443 |
| 4,106,448 | 8/1978 | Noguchi et al. | 123/571 X |
| 4,164,208 | 8/1979 | Okitsu et al. | 123/571 |
| 4,184,470 | 1/1980 | Iizuka | 123/571 X |
| 4,185,604 | 1/1980 | Nagaishi | 123/571 |
| 4,249,382 | 2/1981 | Evans et al. | 123/571 |

FOREIGN PATENT DOCUMENTS

| 52-48739 | 4/1977 | Japan | 123/443 |
| 52-60335 | 5/1977 | Japan | 123/443 |
| 54-106729 | 8/1979 | Japan | 123/577 |
| 54-35258 | 11/1979 | Japan . | |

Primary Examiner—Wendell E. Burns
Attorney, Agent, or Firm—Fleit, Jacobson, Cohn & Price

[57] ABSTRACT

A multiple cylinder engine including a first group of cylinders having a first intake passage which is provided with an air-fuel mixture of a predetermined ratio in accordance with the signal from an exhaust gas sensor provided in the exhaust passage from the first group of cylinders. The engine further includes a second group of cylinders having a second intake passage which is provided with a mixture having an air-fuel ratio which is of a predetermined relationship with respect to the air-fuel ratio of the mixture into the first group of cylinders, the predetermined relationship being determined in accordance the engine operating condition. An exhaust gas recirculation system is provided for controlling the recirculation gas flow to the second intake passage with respect to the recirculation gas flow to the first intake passage in accordance with the engine operating condition.

9 Claims, 2 Drawing Figures

EXHAUST GAS RECIRCULATION CONTROL MEANS FOR MULTIPLE CYLINDER ENGINE HAVING MEANS FOR CONTROLLING AIR-FUEL RATIO IN ACCORDANCE WITH A SIGNAL FROM AN EXHAUST GAS SENSOR

The present invention relates to internal combustion engines and more particularly to exhaust gas recirculating means for a multiple cylinder engine. More specifically, the present invention pertains to exhaust gas control means for a multiple cylinder engine having air-fuel ratio control means in which the air-fuel ratio is controlled in accordance with the signal from exhaust gas sensing means.

In internal combustion engines, it has been known to control air-fuel ratio of the intake mixture by means of an exhaust gas sensor which detects the concentration of a specific constituent of the exhaust gas to produce an output signal so that the fuel control system is controlled in accordance with the output signal of the exhaust gas sensor to establish a desired air-fuel ratio of the intake mixture. This type of control system is usually designed so as to accomplish an air-fuel ratio at or close to the stoichiometric value which is approximately 14.7 in case of gasoline and the exhaust system is provided with a ternary catalytic device to eliminate noxious constituents in the exhaust gas. Conventional engines are also provided with exhaust gas recirculation means by which a part of exhaust gas is returned to the intake system to thereby suppress production of nitrogen oxides.

Usually, as the exhaust gas sensor, use is made of a so-called $O_2$ sensor which is known as having an output that significantly changes in the vicinity of the air-fuel ratio of 14.7. The $O_2$ sensor is therefore very convenient to perform an accurate control when it is desired to obtain an air-fuel ratio at or close to the stoichiometric value. However, it is very often desirable to obtain a richer or leaner mixture depending on the engine operating conditions. For example, a richer mixture is desirable under a light load or heavy load operation or under a low temperature condition in order to obtain a stable engine operation. Further, a leaner mixture may be desirable under a steady engine operation for the purpose of obtaining an improved fuel economy. The $O_2$ sensor usually adopted as the exhaust gas sensor is however inconvenient for such a control because the change in the output of the sensor for a change in the air-fuel ratio becomes small under a richer or leaner air-fuel ratio.

In order to solve the aforementioned problems in the air-fuel ratio control system using an $O_2$ sensor, there is proposed in Japanese Patent Publication No. 54-35258 to control, in a multiple cylinder engine, the air-fuel ratio for one cylinder in accordance with the output of the exhaust gas sensor and the air-fuel ratio for the other cylinders with respect to the air-fuel ratio for the one group cylinders so that the air-fuel ratio can be changed as a whole with respect to the stoichiometric value.

The present invention has an object to provide an exhaust gas recirculation system suitable for a multiple cylinder engine having the aforementioned type of air-fuel ratio control device.

Another object of the present invention is to provide a multiple cylinder engine having means for an accurate control of air-fuel ratio to any desired value as well as means for an accurate control of the exhaust gas recirculation.

According to the present invention, the above and other objects can be accomplished by a multiple cylinder internal combustion engine including first group of cylinder means, second group of cylinder means, an intake system comprising, first intake passage means leading to said first group of cylinder means and second intake passage means leading to said second group of cylinder means, first fuel supply means for providing a supply of fuel to said first intake passage means, second fuel supply means for providing a supply of fuel to said second intake passage means, exhaust passage means leading from said first group of cylinder means for passing exhaust gas therefrom, exhaust gas sensing means disposed in said exhaust passage means for providing an output signal in accordance with a concentration of a constituent in the exhaust gas, first air-fuel ratio control means for controlling the first fuel supply means in accordance with the output of said exhaust gas sensing means so as to provide a first intake mixture of a first predetermined air-fuel ratio, second air-fuel ratio control means for controlling the second fuel supply means in accordance with the first predetermined air-fuel ratio to provide a second intake mixture of a second air-fuel ratio which is at a predetermined relationship with respect to the first air-fuel ratio, first exhaust gas recirculation passage means connecting said exhaust passage means with said first intake passage means, second exhaust gas recirculation passage means connecting the exhaust passage means with said second intake passage means, first recirculation control means for controlling a gas flow in said first exhaust gas recirculation passage means, second recirculation control means for controlling a gas flow in said second exhaust gas recirculation passage means.

The second recirculation control means may include recirculation gas flow compensating means for controlling the gas flow in said second exhaust gas recirculation passage means in accordance with the gas flow in said first exhaust gas recirculation passage means so that the former has a predetermined relationship with respect to the latter, which corresponds to said predetermined relationship between the first and second air-fuel ratio. The compensating means may include engine condition sensing means for sensing an engine condition such as an engine temperature or an engine load so that the predetermined relationship can be determined in accordance with the engine condition.

Figure 2:
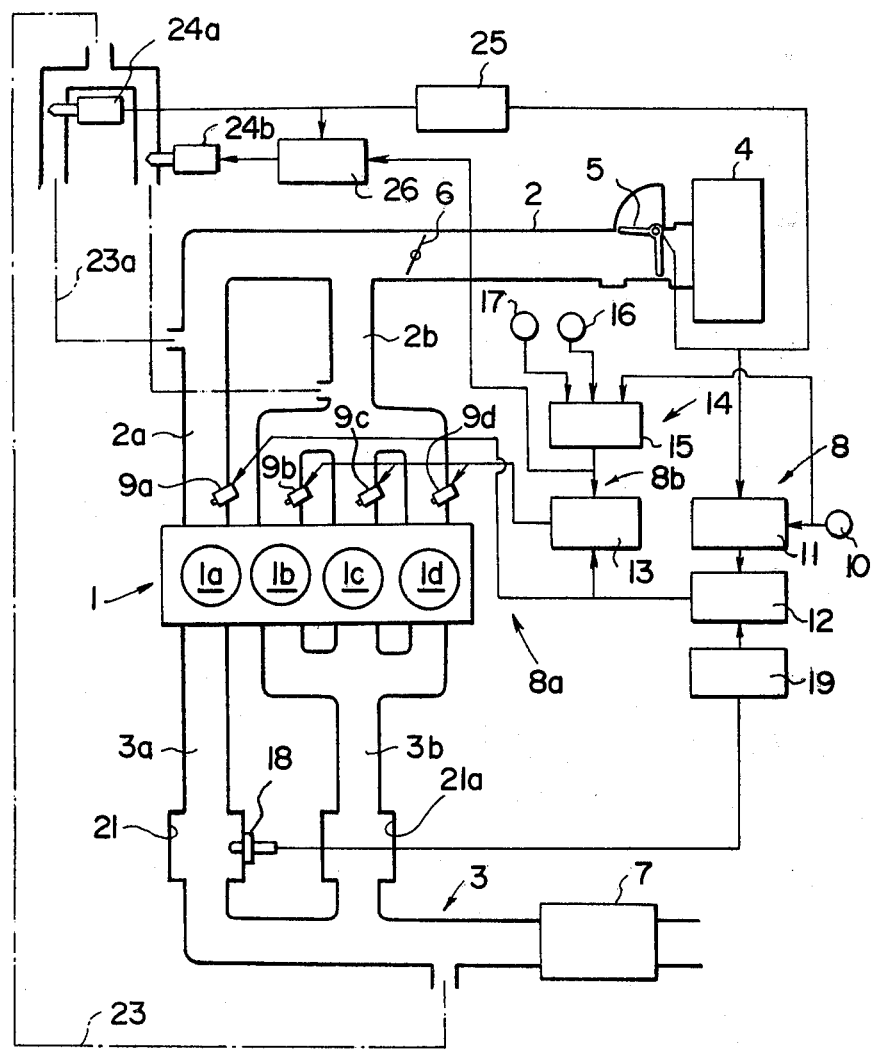

The above and other objects and features of the present invention will become apparent from the following descriptions of preferred embodiments taking reference to the accompanying drawings, in which:

FIG. 1 shows schematically a multiple cylinder engine in accordance with one embodiment of the present invention; and FIG. 2 is a view similar to FIG. 1 but showing another embodiment.

Referring now to the drawings, particularly to FIG. 1, there is shown a four cylinder engine 1 having cylinders 1a, 1b, 1c and 1d. The engine has an intake system including a main intake passage 2 which is branched into intake passages 2a and 2b. The intake passage 2a is connected through branch passages 102a with the cylinders 1b and 1c whereas the intake passage 2b is connected through branch passages 102b with the cylinders 1a and 1d. The cylinders 1b and 1c are not adjacent to each other in respect of the order of combustion and the cylinders 1a and 1d are not adjacent to each other in respect of the order of combustion. The engine further has an exhaust system including an exhaust passage 3a leading from the cylinders 1b and 1c and an exhaust passage 3b leading from the cylinders 1a and 1d. The exhaust passages 3a and 3b are merged into an exhaust manifold 3 which has a catalytic converter 7 disposed therein.

The main intake passage 2 is provided at the upstream end with an air cleaner 4. A throttle valve 6 is provided in the main intake passage 2 to control the air flow into the cylinders. The engine is equipped with a fuel supply system 8 which includes fuel injection valves 9a, 9b, 9c and 9d which are associated respectively with the branch intake passages. An air flowmeter 5 is provided in the main intake passage 2 between the air cleaner 4 and the throttle valve 6 and produces an air flow signal which is applied to an oscillator 11. An engine speed sensor 10 is provided to detect the engine speed and applies an engine speed signal to the oscillator 11. The oscillator 11 produces a pulsating output of which pulse width is determined in accordance with the air flow signal and the engine speed signal to control the amount of fuel supply in one operating cycle. The output pulse of the oscillator 11 is applied to a processing circuit 12.

The exhaust passage 18 is provided with an exhaust gas sensor 18 such as an $O_2$ sensor which applies an output to an air-fuel ratio adjusting circuit 19 which produces an adjusting signal to apply it to the processing circuit 12. The processing circuit 12 produces an output pulse of which pulse width is determined in accordance with the pulse width of the output from the oscillator 11 and the signal from the circuit 19. The output of the circuit 12 is applied to the fuel injection valves 9b and 9c which are provided in the branch intake passages 102a to control the durations of fuel injection through these valves. It should be noted that the fuel injection valves 9b and 9c constitute a first fuel supply device 8a and the control through the processing circuit 12 of the first fuel supply device 8a produces an air-fuel mixture having mixing ratio at or close to the stoichiometric value.

The output of the processing circuit 12 is also applied to a pulse modifying circuit 13 which produces an output for controlling a second fuel supply device 8b constituted by the fuel injection valves 9a and 9d. There are provided an engine temperature sensor 16 and an intake suction pressure sensor 17 which produce output signals to be applied to a modifying oscillator 15 which constitutes an air-fuel ratio modifying device 14. The output from the engine speed sensor 10 is also applied to the oscillator 15. The oscillator 15 produces a modifying signal in accordance with the engine operating condition which is judged by the signals from the sensors 10, 16 and 17. The modifying signal is applied to the pulse modifying circuit 13 to modify the width of the pulse from the processing circuit 12 in accordance with the engine operating condition. Thus, the fuel ratio modifying device 14 functions to enrich the mixture supplied to the cylinders 1a and 1d under a cold engine operation or under a light load or heavy lead operation to ensure a stable engine operation whereas a mixture of the stoichiometric ratio is supplied to the cylinders 1a and 1d under a medium load operation. Further, a leaner mixture may be supplied to the cylinders 1a and 1d under a steady engine operation.

The intake system is further provided with an exhaust gas recirculation system 22 including a recirculation passage 23 extending from the exhaust manifold 3. The passage 23 is opened through branch passages 23a and 23b respectively with the intake passages 2a and 2b. In the passages 23a and 23b, there are respectively provided control valves 24a and 24b which may be proportional solenoid valves of which openings are proportionated with electric current applied thereto. In order to control the current to the valves 24a and 24b, there is provided a valve driving circuit 25 which receives the output signal from the air flow sensor 5 and produces an output signal for determining the amount of recirculation gas to be introduced into the cylinders 1b and 1c. The signal from the driving circuit 25 is therefore directly applied to the control valve 24a. The output from the driving circuit 25 is further applied to a modifying circuit 26 which also receives the signal from the oscillator 15 to produces a modified signal for energizing the control valve 24b. The exhaust gas recirculation system 22 therefore functions to control the amount of recirculation gas in accordance with the air-fuel ratio so that a larger amount of gas is recirculated when a richer mixture is being supplied.

In the intake system, there is also provided a mixing preventing device 20 which comprises, in this embodiment, a first and second check valves 20a and 20b respectively located in the intake passages 2a and 2b. The check valves 20a and 20b may be of a reed type of known structure.

In the exhaust passage 3a, there is formed downstream of the exhaust gas sensor 18 with an expansion chamber 21 which serves to prevent back flow of the exhaust gas into the exhaust passage 3a.

In the arrangement described above, the mixture to be supplied to the cylinders 1b and 1c is maintained substantially at a predetermined air-fuel ratio, for example at the stoichiometric ratio, due to the feedback control using the signal from the exhaust gas sensor 18. The mixture to the cylinders 1a and 1d is modified in accordance with the engine operating condition to adjust the air-fuel ratio as a whole.

The check valves 20a and 20b provided in the intake passages 2a and 2b function to prevent the mixtures in the passages 2a and 2b from being mixed with each other due to pulsations in the intake passages. Thus, it is possible to maintain the air-fuel ratio of the mixture to be supplied to the cylinders 1b and 1c accurately at the predetermined value and at the same time to control the air-fuel ratio of the mixture to the cylinders 1a and 1d at a desired value. In the illustrated embodiment, the branch intake passages 102a and 102b are connected with the main intake passage 2 through the intake passages 2a and 2b, respectively. However, the passages 102a and 102b may be connected directly with the main intake passage 2. In that case, the check valves are located in the branch passages 102a and 102b.

Referring now to FIG. 2, there is shown another embodiment of the present invention. In this embodiment, corresponding parts are shown by the same reference numerals as in the previous embodiment. In this embodiment, the main intake passage 2 is connected through an intake passage 2a with a first cylinder 1a and through an intake passage 2b and branch passages 102 with the other cylinders 1b, 1c and 1d. The exhaust gas recirculation system is constructed as in the previous embodiment so that the amount of recirculation gas to the intake passage 2b is controlled in accordance with the engine operating conditions. In this embodiment, the exhaust passage 3b is also provided with an expansion chamber 21a.

The invention has thus been shown and described with reference to specific embodiments, however, it should be noted that the invention is in no way limited to the details of the illustrated arrangements but changes and modifications may be made without departing from the scope of the appended claims.

We claim:

1. A multiple cylinder interval combustion engine including first group of cylinder means, second group of cylinder means, an intake system comprising, first intake passage means leading to said first group of cylinder means and second intake passage means leading to said second group of cylinder means, first fuel supply means for providing a supply of fuel to said first intake passage means, second fuel supply means for providing a supply of fuel to said second intake passage means, exhaust passage means leading from said first group of cylinder means for passage exhaust gas therefrom, exhaust gas sensing means disposed in said exhaust passage means for providing an output signal in accordance with a concentration of a constituent in the exhaust gas, first air-fuel ratio control means for controlling the first fuel supply means in accordance with the output of the exhaust gas sensing means so as to provide a first intake mixture of a first predetermined air-fuel ratio, second air-fuel ratio control means for controlling the second fuel supply means in accordance with the first predetermined air-fuel ratio to provide a second intake mixture of a second air-fuel ratio which has a predetermined relationship with respect to the first air-fuel ratio, first exhaust gas recirculation passage means connecting said exhaust passage means with said first intake passage means, second exhaust gas recirculation passage means connecting the exhaust passage means with said second intake passage means, first recirculation control means for controlling a gas flow in said first exhaust gas recirculation passage means, second recirculation control means for controlling a gas flow in said second exhaust gas recirculation passage means.

2. An engine in accordance with claim 1 in which said second recirculation control means comprises recirculation gas flow compensating means for controlling the gas flow in said second exhaust gas recirculation passage means in accordance with the gas flow in said first exhaust gas recirculation passages means so that the gas flow in the second recirculation passage means has a predetermined relationship with respect to the gas flow in the first recirculation passage means, which corresponds to the predetermined relationship between the first and second air-fuel ratio.

3. An engine in accordance with claim 2 in which said compensating means includes engine condition sensing means for sensing an engine operating condition and modifying means for determining the relationship between the gas flows in the first and second recirculation passage means in accordance with the engine operating condition.

4. An engine in accordance with claim 3 in which said engine operating condition sensing means is engine temperature sensing means, said modifying means being adapted to determine the predetermined relationship between the first and the second air-fuel ratios so that said second intake mixture is enriched when the engine is under a warming-up temperature.

5. An engine in accordance with claim 3 in which said engine operating condition sensing means is engine load sensing means, said modifying means being adapted to determine the relationship between the first and second air-fuel ratios so that said second intake mixture is enriched under light load and heavy load engine operation.

6. An engine in accordance with claim 1 in which said first and second groups of cylinders have the same number of cylinders.

7. An engine in accordance with claim 6 in which each group of cylinders includes cylinders which are not adjacent to each other in respect of order of combustion.

8. An engine in accordance with claim 1 in which said first and second fuel supply means comprise fuel injections valve means, said first air-fuel ratio control means including circuit means for providing output pulses of which width is determined in accordance with an engine operating condition signal and the output of the exhaust gas sensing means, said second air-fuel ratio control means includes modifying circuit means for modifying the output pulses of the circuit means in the first air-fuel ratio control means.

9. An engine in accordance with claim 1 in which said exhaust gas sensing means is oxygen concentration detecting means.

* * * * *